(No Model.)

R. HARTSON.
THILL COUPLING.

No. 494,476.  Patented Mar. 28, 1893.

Witnesses—
Geo. E. Frech.
Rob. A. Fitzgerald.

Inventor—
Ralph Hartson
per Lehmann, Pattison & Nesbit
attys.

UNITED STATES PATENT OFFICE.

RALPH HARTSON, OF RICHMOND CENTRE, OHIO.

THILL-COUPLING.

SPECIFICATION forming part of Letters Patent No. 494,476, dated March 28, 1893.

Application filed August 10, 1892. Serial No. 442,704. (No model.)

*To all whom it may concern:*

Be it known that I, RALPH HARTSON, of Richmond Centre, in the county of Ashtabula and State of Ohio, have invented certain new and useful Improvements in Thill-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in thill couplings, and it consists in the novel features of construction which will be fully described hereinafter, and more particularly referred to in the claim.

The object of my invention is to make a most secure connection between the clamp arm and the thill whereby all play is taken up and rattling of the several parts effectually prevented.

Figure 1:
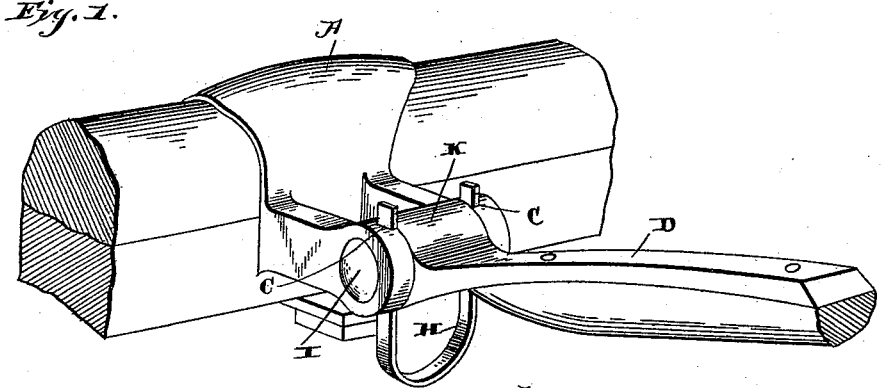
Figure 2:
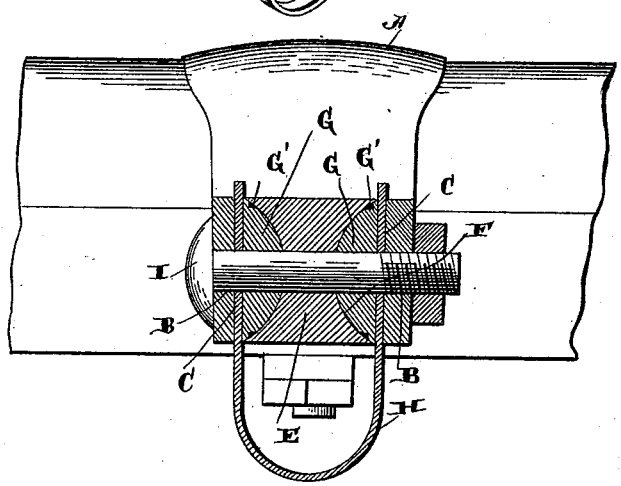
Figure 3:
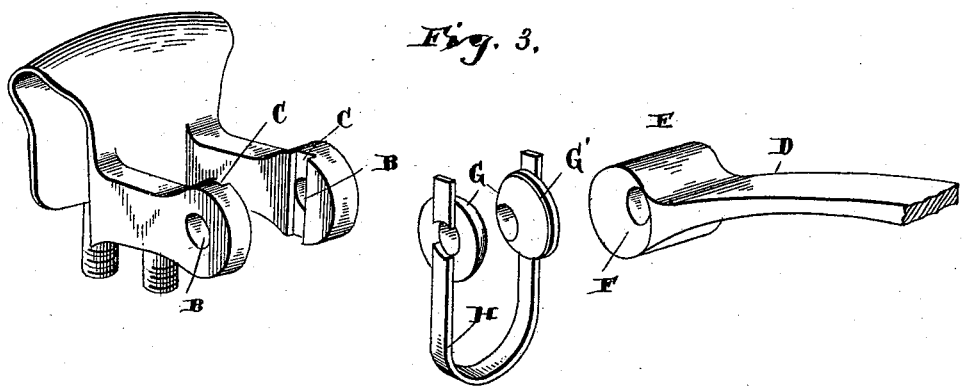

Referring to the accompanying drawings,— Figure 1, is a perspective view of my improved coupling. Fig. 2, is a cross sectional view of the same. Fig. 3, is a view of the parts detached.

A represents the forked clip arm which is clamped to and projects from the axle in the usual manner. In the outer ends of the forks are formed the transverse bolt openings B, and formed upon the inner sides of their outer ends are the vertical grooves C which intersect the bolt passages B.

D represents the thill arm having the perforated head E at its end as shown. The sides of this head are reamed out, as illustrated at F, and into these openings or sockets fit the cup shaped perforated bearings points G. These bearing points are secured to the inner sides of the ends of the yoke H, which are perforated.

Grooves G' are formed around the convex sides of the bearing points G for the purpose of catching dust or grit which may become deposited on the bearings.

The width of the head E is the same as the width of the space between the arms of the portion A, so that the head fits between the latter quite snugly.

The bearing points G fit within the side openings F of the head and hence do not protrude laterally. The ends of the yoke H however, being on the outer sides of the said points project therefrom and for their accommodation the vertical slots C are provided.

The thill is easily placed in position by clasping the head E with the yoke H and bearing points G, and then sliding them into position between the forks of the arm A. They are then secured together by a clamping bolt I, which when drawn tightly prevents all shaking and rattling.

The object of the yoke is to hold the bearings G to the eye of the arm D when the latter is removed from the clip A. They are thus prevented from dropping out and becoming lost. A ball and socket bearing is thus provided for the thills in their pivotal movement while at the same time all strain is removed from the bolt to the forks of the arm A, being taken thereto directly through the bearing points G, and the ends of the yoke H, resting in the slots C.

Having thus described my invention, what I claim, and desire to secure by Letters Patent, is—

The combination of a forked clip arm having perforated and slotted outer ends, a thill arm having a perforated head, the ends of the said head being reamed out, bearing points adapted to fit in said reamed out openings, a yoke to the ends of which the said points are secured, the said yoke ends resting when in position in the slots of the forked arm, and a clamping bolt, substantially as shown and described.

In testimony whereof I affix my signature in presence of two witnesses.

RALPH HARTSON.

Witnesses:
C. S. SMITH,
J. C. HARVEY.